(12) United States Patent
Parry

(10) Patent No.: US 7,631,350 B2
(45) Date of Patent: Dec. 8, 2009

(54) TRANSMITTING DATA ACROSS FIREWALLS

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1594 days.

(21) Appl. No.: 10/091,740

(22) Filed: Mar. 6, 2002

(65) Prior Publication Data
US 2003/0172300 A1 Sep. 11, 2003

(51) Int. Cl.
G06F 9/00 (2006.01)
G06F 15/16 (2006.01)
G06F 17/00 (2006.01)

(52) U.S. Cl. .............. 726/11; 726/3; 713/153; 713/154; 709/238; 709/239; 709/240; 709/241; 709/242; 709/243; 709/244; 705/79

(58) Field of Classification Search .......... 713/200, 713/201, 153–154; 726/1, 11; 709/238–244; 705/79
See application file for complete search history.

(56) References Cited

U.S. PATENT DOCUMENTS

| | | | |
|---|---|---|---|
| 6,334,124 B1* | 12/2001 | Bouchard et al. | 707/3 |
| 6,742,039 B1* | 5/2004 | Remer et al. | 709/229 |
| 6,832,256 B1* | 12/2004 | Toga | 709/229 |
| 6,880,089 B1* | 4/2005 | Bommareddy et al. | 726/11 |
| 7,082,464 B2* | 7/2006 | Hasan et al. | 709/223 |
| 7,200,662 B2* | 4/2007 | Hasan et al. | 709/226 |
| 7,516,485 B1* | 4/2009 | Lee et al. | 726/11 |
| 2002/0199114 A1* | 12/2002 | Schwartz | 713/201 |
| 2007/0150597 A1* | 6/2007 | Hasan et al. | 709/226 |

* cited by examiner

*Primary Examiner*—Edan Orgad
*Assistant Examiner*—Farid Homayounmehr

(57) ABSTRACT

Systems and methods for transmitting data across a firewall are described. A representative method includes: receiving a request to transmit data to a destination; searching for a firewall associated with the destination, the firewall being configured to prohibit communication to the destination via a primary communication protocol and allow communication to the destination via a secondary communication protocol. If the firewall is detected, automatically configuring the data for communication with the secondary communication protocol; and transmitting the data to the destination by utilizing the secondary communication protocol. Other devices and programs are disclosed.

34 Claims, 5 Drawing Sheets ical formats has resulted in the creation of a variety of such formats, each of which requires a resource for conversion to another format. The wide variety of resources (which in some cases may be referred to as "drivers") available to convert data from one application-specific format to another can create quite a problem. Oftentimes, the necessary resources are dispersed throughout a network. In other situations, client machines in a network may all have the necessary resources to convert the data. This creates redundancy and a waste of space.

TRANSMITTING DATA ACROSS FIREWALLS

FIELD OF THE INVENTION

The present invention generally relates to data communication. More specifically, the invention relates to systems and methods for transmitting data across firewalls.

DESCRIPTION OF THE RELATED ART

Since the advent of computer systems, digital information has become a valuable asset. The processing of digital information has developed with improvements in the computer systems. For instance, several relatively large main frame systems were required to process the same amount of information that a notebook computer can process today.

Generally, the development of hardware (i.e. microprocessors, memory, etc.) has increased the processing speed and reduced the overall size of computer systems. The development of software that runs on computer systems has also contributed to improving the processing of digital information. Application software, in particular, has improved processing the digital information. One side effect that has accompanied the development of application software, however, is that the software tends to require the digital information to be in a specific format. Once the information is in the specific format, the application software can process the information more efficiently.

The need for application-specific formats has resulted in the creation of a variety of such formats, each of which requires a resource for conversion to another format. The wide variety of resources (which in some cases may be referred to as "drivers") available to convert data from one application-specific format to another can create quite a problem. Oftentimes, the necessary resources are dispersed throughout a network. In other situations, client machines in a network may all have the necessary resources to convert the data. This creates redundancy and a waste of space.

One possible solution to this is to have a central location that serves as a point of contact for all the required resources necessary to convert data in a network. When this central location is located within the network and protected by the network firewall, complications caused by the firewall may be avoided. When this central location (i.e. a remote server) is located outside of the firewall, complications may arise. For example, suppose a document is requested to be printed on a network printer located within a network. The document, typically, would have to be converted to a language the printer can interpret, such as Postscript. The resources for converting the document data to Postscript may be located at a remote location outside of the firewall. The firewall protecting the network printer may block communication between the remote location and the network printer, resulting in a failure in transmission.

For the purposes of this disclosure a firewall is a set of related programs, located at a network gateway server, that protects the resources of a private network from users from other networks. An enterprise with an intranet that allows its workers access to the wider Internet, typically, installs a firewall to prevent outsiders from accessing its own private data resources and for controlling outside resources to which its own users are to have access. A firewall is often installed in a specially designated computer separate from the rest of the network so that no incoming request can get directly at private network resources. It would be desirable in some instances to be capable of automatically rerouting communication of data to avoid conflicts caused by a firewall.

Based on the foregoing it should be appreciated that there is a need for improved systems and methods that address the aforementioned and/or other shortcomings of the prior art.

SUMMARY OF THE INVENTION

The present invention relates to transmitting data across firewalls. In this regard, a representative method includes: receiving a request to transmit data to a destination; searching for a firewall associated with the destination, the firewall being configured to prohibit communication to the destination via a primary communication protocol and allow communication to the destination via a secondary communication protocol. If the firewall is detected, automatically configuring the data for communication with the secondary communication protocol; and transmitting the data to the destination by utilizing the secondary communication protocol.

Another embodiment may be construed as a system for rerouting the transmission of data to avoid a firewall. The system includes: a transmission device configured to search for a firewall protecting a destination, the firewall being configured to prohibit communication to the destination via a primary communication protocol and allow communication to the destination via a secondary communication protocol. The transmission device is further configured to, upon detection of the firewall, automatically configure the data for communication over the secondary communication protocol and transmit the data by utilizing the secondary communication protocol.

In other embodiments, the invention may be construed as a transmission device configured to transmit data to a destination. The transmission device includes means for transmitting the data by utilizing a secondary communication protocol; means for searching for a firewall, the firewall being configured to prohibit communication to the destination by a primary communication protocol and allow communication to the destination via the secondary communication protocol; and means for automatically configuring the data for communication for the secondary communication protocol upon detecting the firewall.

In yet other embodiments, the invention may be construed as a data transmission program stored on a computer-readable medium. The transmission program includes logic configured to facilitate the transmission of data by utilizing a secondary communication protocol; logic configured to search for a firewall; and logic configured to automatically configure communication for the secondary communication protocol upon detecting the firewall.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, methods, systems, devices and programs of the invention can be used to transmit data across a firewall. In this regard, the transmission of the data can be routed via a secondary communication protocol if a firewall is detected. By so doing, complications that may be caused by a firewall can be avoided.

Figure 1:
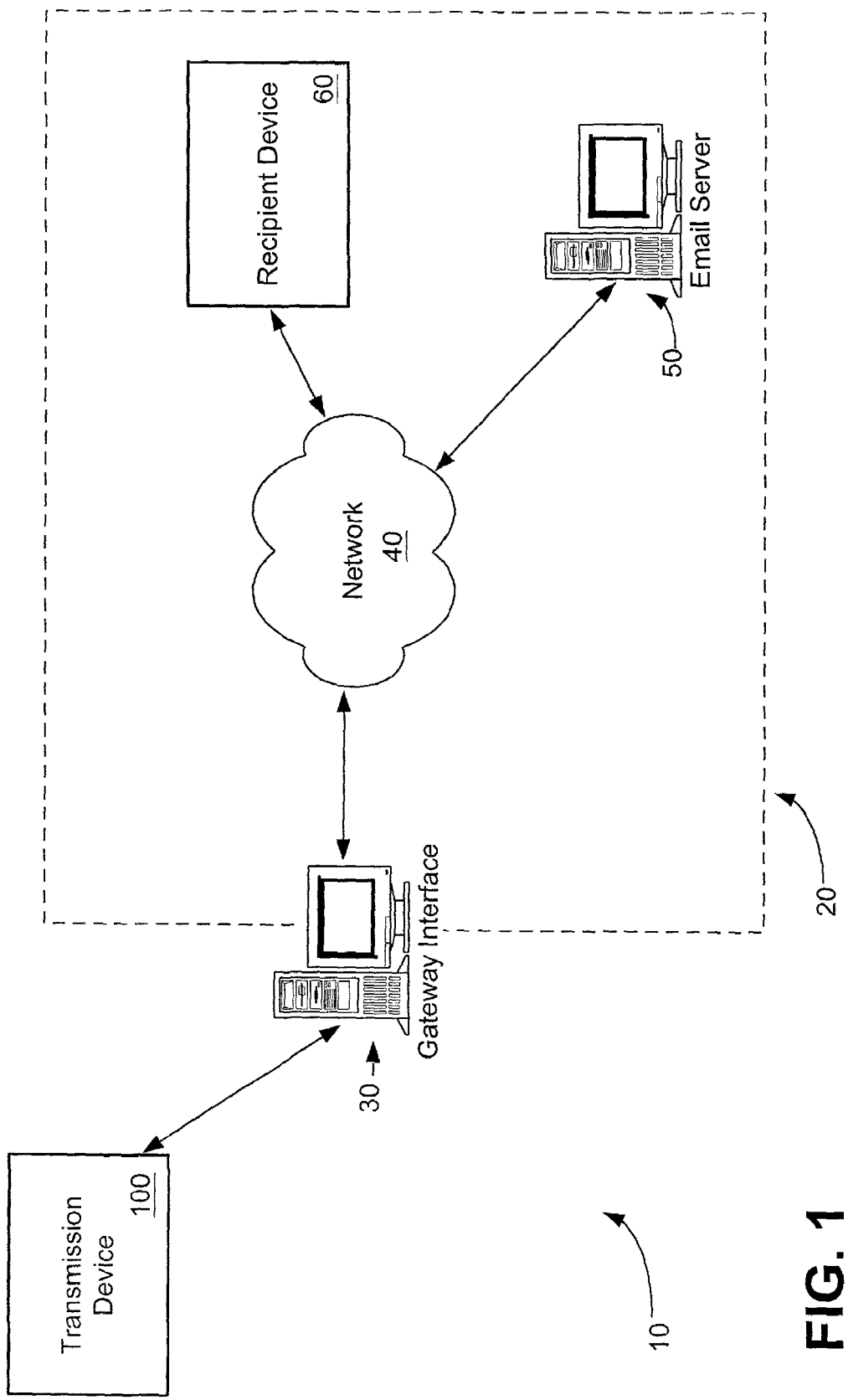
FIG. 1 is a schematic representation of an embodiment of the present invention.

Referring now in more detail to the drawings, FIG. 1 is a schematic representation of an embodiment of the present invention. Shown in FIG. 1 is a data transmission system 10. The data transmission system 10 includes, among other devices, a transmission device 100 and a recipient device 60. The transmission device 100 is arranged at the transmit end and the recipient device 60 is arranged at the receive end of a communication channel.

The recipient device may be communicatively coupled to a network 40. An email server 50 and a gateway interface 30 may be coupled to the network 40 as well. A firewall 20, maintained by the gateway interface 30, may protect the devices contained within the network 40 as well as those devices coupled to the network 40, such as the recipient device 60 and the email server 50.

The transmission device 100 may be any computing device that can generally transmit data. In the schematic represented in FIG. 1, the transmission device 100 is located remotely from the network 40. In this particular case, the transmission device may communicate with the network 40, and likewise the recipient device 60, via the gateway interface 30. The transmission device 100 may be communicatively coupled to the gateway interface 30 by a variety of communication mediums. For example, the Internet, the Plain Old Telephone Service (POTS) network, wirelessly via radio frequency (RF) communication, etc. In other embodiments, the transmission device 100 may be located inside the firewall 20 and may be configured to communicate with the recipient device 60 directly. The functionality and structure of the transmission device 100 will be described further below.

The recipient device 60 may be any computing device that is capable of receiving data. In the schematic represented in FIG. 1, the recipient device 60 is protected by the firewall 20. Limited access may be available to the recipient device 60 depending on how the firewall 20 is configured. The recipient device 60 may be configured to communicate directly with devices external to the network 40, or more than likely, could be configured to communicate with devices within the firewall 20. The medium in which the recipient device 60 may communicate with other devices may vary. The functionality of the recipient device 60 will be described further below.

The network 40 may be any type of communication network in which various computing devices can communicate. For example, but not limited to, the network 40 could be a Local Area Network (LAN) or a Wide Area Network (WAN) and could utilize the Internet. The network 40 could include various hardware components such as routers and bridges (not shown) to facilitate the communication between the various interconnected devices.

For the purposes of this disclosure a gateway interface 30 may be a network point that acts as an entrance to the network 40. The gateway interface 30 may work with a router to route the data traffic entering and leaving the network 40. The gateway interface 30 may also help in routing the traffic within the network 40. The gateway interface 30 may also be a server that facilitates and maintains the firewall 20. In other embodiments, a firewall 20 may not be present and so a gateway interface 30 may not be necessary, or perhaps, may only act to control and monitor the network traffic. Generally, the gateway interface 30 acts as the bridge between the network 40 and other external networks such as the Internet.

The email server 50 is utilized to provide electronic mail (email) to the devices connected to the network. Email is the exchange of computer stored messages by telecommunication and may be the most utilized application of the Internet. Generally, an email, or similarly called an email message, is sent to an email address and/or several email addresses. The email may contain textual information, such as a Subject of the email, a Body of the email, and possibly a file attached to the email. The email server 50 may receive incoming emails from outside the network 40 via the gateway interface 30. From there, the email server 50 may recognize the targeted address and route the email to the appropriate address within the network 40. Outgoing email may be processed through the email server 50 the same general way as incoming email is received. The email server 50 may also maintain and process intra-network email as well.

The firewall 20 serves to protect the network 40 and its devices coupled to it (i.e. the recipient device 60 and the email server 50). The firewall 20 may be maintained by the gateway interface 30. Several configurations of the firewall 20 may be possible. Each configuration may allow different communication protocols to penetrate the firewall 20, and likewise, prohibit other communication protocols from gaining access to the network 40.

Several other devices not shown in FIG. 1 may be coupled to the network 40. For instance, several client machines may be coupled to the network 40 as well as several different types of servers and peripheral appliances. These devices have been omitted from the schematic for clarity purposes.

In operation, the data transmission system 10 serves to communicate data from the transmission device 100 to the recipient device 60. Without complications that may arise from the firewall 20, the transmission of data from the transmission device 100 to the recipient device 60 would be relatively easy and could be accomplished in a wide variety of ways. The need for the security firewall 20 to protect the network 40, and the recipient device 60 complicates the matter. The transmission device 100 may receive a request to, after performing several other possible operations, send data to the recipient device 60. The request may include a primary and a secondary address of the recipient device 60. Each address relates to the recipient device 60 and utilizes a different communication protocol. More than two communication protocols could be utilized as long as the recipient device and the transmission device 100 have the resources to utilize them. The primary address would typically be the Internet Protocol (IP) address of the recipient device 60. The IP address is related to the Transmission Control Protocol/Internet Protocol (TCP/IP) suite of communication protocols. TCP/IP is the primary communication protocol utilized for Internet communication. TCP/IP uses packet switching to transfer packets of data from one device to another via a network of communication links. The IP address of the recipient device 60 includes the network address of the network 40 (as maintained by the gateway interface 30) as well as the particular address of the recipient device 60 within the network 40. Several higher-level communication protocols and applications utilize TCP/IP to communicate data.

The firewall 20 may be configured to prohibit direct communication from the transmission device 100 to the recipient device 60 via some communication protocols, such as the Hypertext Transfer Protocol (HTTP). HTTP is a higher level communication protocol used to transfer video, audio, images, and other multimedia files via the World Wide Web. HTTP utilizes the lower level TCP/IP to communicate. In this case, the gateway interface 30 may recognize this attempt to communicate and blocks the transmission of data.

Once the transmission device 100 receives the request to transmit data, the transmission device 100 can search the recipient device 60 for the firewall 20 that may be protecting it. Various methods can be used to search for a firewall. For instance, the IP address of the recipient device 60 can be "pinged" with a packet to see if communication is allowed. Another possible method is to use the IP address to scan the recipient device 60 for open communication ports. If an open port is found for, in this example, HTTP (port 80), then communication via HTTP may be possible. Another possible method for checking for a firewall is to simply attempt to transmit the data to the primary address utilizing the primary communication protocol. If a failure arises, then it could be inferred that the firewall 20 is present.

If the firewall 20 is not detected, the transmission device 100 may transmit the data to the recipient device 60 via the primary communication protocol. The data may be routed through the gateway interface 30 and the network 40.

If the firewall 20 is detected, the transmission device 100 may set up communication of the data in an alternative form to the secondary address of the recipient device 60. The secondary address may be an email address of the recipient device 60 and is typically related to a suite of email protocols: Simple Mail Transfer Protocol (SMTP), Post Office Protocol Version 3 (POP3), and Internet Message Access Protocol (IMAP). SMTP is used to transmit email messages, or emails, over the Internet. POP3 and IMAP are conversely used to receive email messages. The firewall 20 may be configured to allow communication via email. An email may be automatically generated to transmit the desired data by the transmission device 100. From there, the email is sent. The gateway interface 30 would recognize that the data is in email form and route it to the email server 50. The email server 50 may then transmit the data to the recipient device 60 in some other form of communication or the recipient device 60 may be configured to "pull" data from the email server 50, periodically. Oftentimes, email is one of the few methods of communication that is allowed by a firewall. The method in which an email is automatically generated is discussed in more detail in FIG. 5.

It is important to note that HTTP may not be the only primary communication protocol. The File Transfer Protocol (FTP) and TelNet are other common communication protocols. Likewise, an email protocol such as SMTP may not be the only secondary communication protocol FTP could be the secondary communication protocol if the firewall 20 allowed FTP communication. The primary communication protocol and the secondary communication protocol are meant to be communication protocols that both the transmission device 100 and the recipient device 60 can readily utilize. The essence of the invention lies in that the secondary communication protocol is utilized in the event the firewall 20 is detected and the primary communication protocol is utilized in the event the firewall 20 is not detected. To that, a third communication protocol could be utilized if the primary and secondary communication protocols fail. The invention should not be limited to the specific communication protocols mentioned above.

Figure 2:
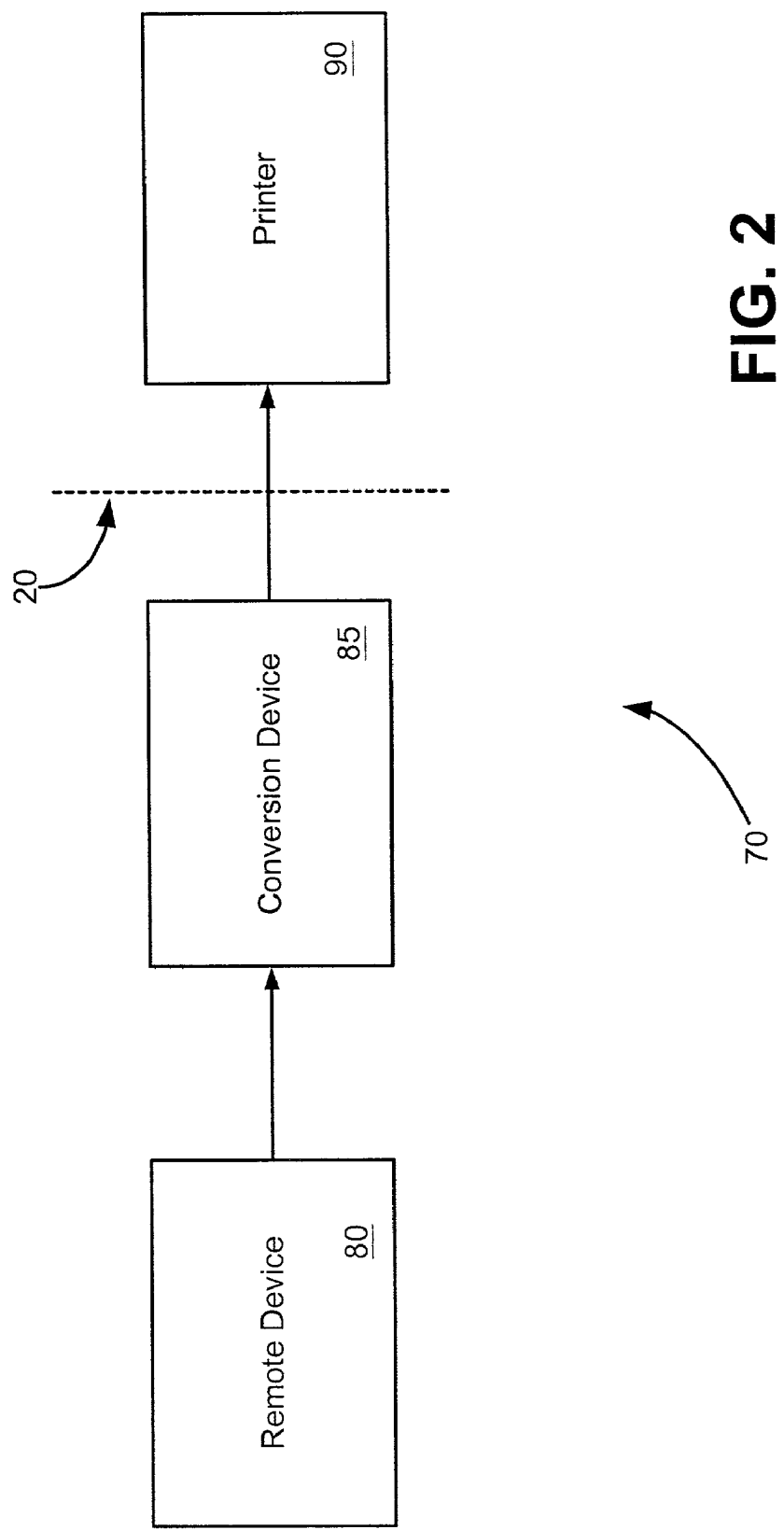
FIG. 2 is a schematic representation of another embodiment of the present invention.

Reference is now made to FIG. 2, which is another embodiment of the present invention. Data transmission system 70 may be interpreted as a more application specific embodiment of the present invention. The data transmission system 70 includes a remote device 80 in communication with a conversion device 85 which in turn is in communication with a printer 80. A firewall 20, similar to that of FIG. 1, protects the printer 80 from external devices.

The remote device 80 may be any device that can communicate directly or indirectly with the conversion device 80. In operation, the remote device 80 may send a request to the conversion device 85. The request may ask for the conversion device 85 to perform several operations on some data and then pass the data along to the printer 90. Included within the request may be the primary and secondary address of the printer 90.

The conversion device 85 is similar to the transmission device 100 of FIG. 1 in that it is the transmit end of a communication channel. The conversion device 85 may be a computing device 85 that can convert data from one format to another. For example, the conversion device 85 may be configured to convert data in Microsoft Word™ format to Postscript format for printing. After the conversion is complete the conversion device 85 can attempt to transmit the data (now in Postscript format) to the printer 90.

The printer 90 is a device that can render image and textual data onto paper. In this embodiment, the printer 90 may be a component of a network (not shown) protected by the firewall 20. Desktop printers typically require a connection to a personal computer (PC) to be accessible from the network. Network printers have the hardware and software to communicate directly with the network. In this embodiment, the printer 90 is similar to the network printer 90 in that it may communicate directly with the network and so can be directly accessible via the network from other machines, this, of course, disregards any complications caused by the firewall 20. The printer 90 may also have the ability to receive email, retrieve data from the World Wide Web, or be configured for FTP.

The operation of the data transmission system 70 is similar to that of the data transmission system 10 of FIG. 1. Once the conversion device 85 has completed conversion, it begins searching for the firewall 20. Upon not detecting the firewall 20, the converted data may be transmitted to the primary address of the printer 90 utilizing a primary communication protocol. Once again, the primary communication protocol may be any communication protocol in which the conversion device 85 and the printer 90 can both utilize. In the event the firewall 20 is detected, the conversion device 85 can automatically configure communication to the secondary address of the printer 90 by utilizing a secondary communication protocol. The secondary address may be an email address or an FTP address. The conversion device 85 is configured to automatically configure the data for the secondary communication protocol in the event the firewall 20 is detected. This will be discussed in more detail in FIG. 5.

Figure 3:
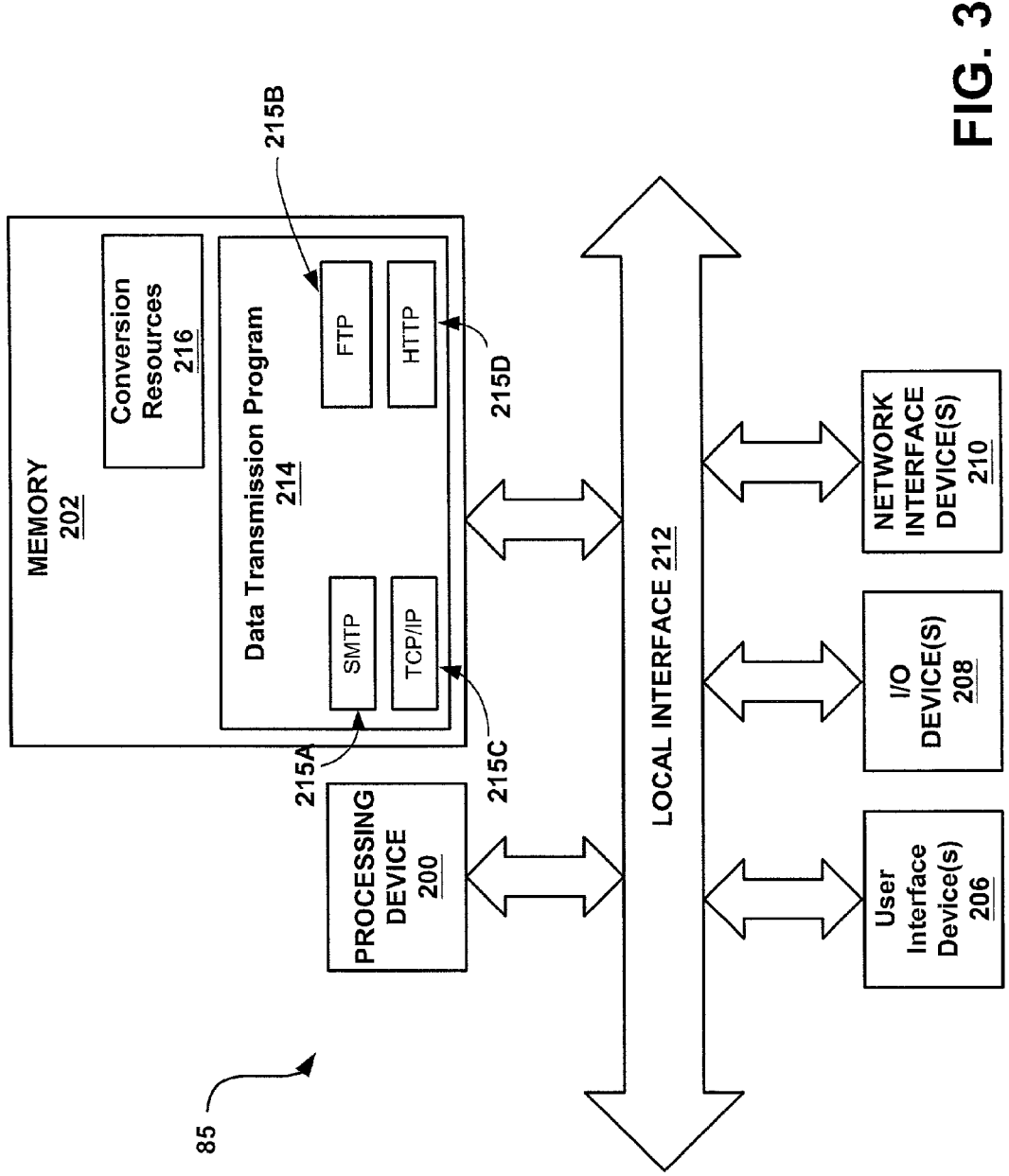
FIG. 3 is a schematic representation of the conversion device 85 of FIG. 2.

The conversion device 85 of FIG. 2 and likewise the transmission device 100 of FIG. 1 is now discussed in more detail in the schematic representation of FIG. 3. As indicated in FIG. 3, the conversion device 85 can include a processing device 200, memory 202, one or more user interface devices 206, one or more input/output (I/O) devices 208, and one or more network interface devices 210. Each of these components is connected to a local interface 212 that, by way of example, incorporates one or more internal buses. The processing device 200 is adapted to execute commands stored in memory 202 and can include a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the conversion device 85.

The one or more user interface devices 206 typically include interface tools with which the device settings can be changed and through which the user can communicate commands to the conversion device 85. By way of example, the user interface devices 206 may include one or more function keys and/or buttons with which the operation of the conversion device 85 can be controlled, and a display, such as a liquid crystal display (LCD), with which information can be visually communicated to the user and, where the display includes a touch-sensitive screen, commands can be entered. In the data transmission system 70 of FIG. 2 no user interaction with the conversion device 85 may be necessary. Regardless, a description of the user interface device(s) 206 has been included.

With further reference to FIG. 3, the one or more I/O devices 208 are adapted to facilitate connection of the conversion device 85 to another device and may therefore include one or more serial, parallel, small computer system interface (SCSI), universal serial bus (USB), IEEE 1394 (e.g., Firewire™), and/or personal area network (PAN) components. The network interface devices 210 comprise the various components used to transmit and/or receive data. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc. The network interface device(s) 210 are capable of communicating with both the remote device 80 and the printer 90. In the case of the transmission device 100, the network interface device(s) 210 are capable of communicating either directly or indirectly with the gateway interface 30 and possibly the network 40, the recipient device 60, and the email server 50.

The memory 202 includes the data transmission program 214 and conversion resources 216. A variety of firmware programs, or drivers, 215A-D may be included within the data transmission program 214 or the drivers 215A-D may be located in the memory 202 and called upon by the data transmission program 214. The software and firmware programs located in the memory 202 may be operated on the devices located in the conversion device 85 by the processing device 200.

The data transmission program 214 can operate the conversion device 85 (and likewise the transmission device 100) to perform the data transmission. Programming logic may be incorporated within the data transmission program 214 to perform the general method. The drivers 215A-D are associated with different communication protocols that the conversion device 85 and the transmission device 100 are capable of utilizing. The SMTP protocol 215A may be one protocol found in the data transmission program 214. The FTP protocol 215B (See FIG. 1), the TCP/IP suite 215C, and the Hypertext Transfer Protocol (HTTP) 215D may all be included in the data transmission program 214 to facilitate communication with other devices. The drivers 215A-D may work with the I/O device(s) 208, but more typically will work with the network interface device(s) 210 to facilitate communication. As mentioned above, the drivers 215A-D may be located within the data transmission program 214, or may be located externally from the program 214 but within the memory 202 and thus called upon by the program 214.

In operation, the data transmission program 214 may set up the search for the firewall 20. Upon not detecting the firewall 20, the data transmission program 214 may work with the drivers 215A-D to communicate the data to the printer 90 and/or the recipient device 60. Upon detecting the firewall 20, the data transmission program 214 can automatically set up communication for the secondary communication protocol. For example, the data transmission program 214 can build an email, populate the data in the email, and send the data, with the help of the SMTP protocol 215A, to the printer 90 and/or the recipient device 60. Integrity checking as well as quality control could be performed in the data transmission program 214. In another embodiment, the secondary communication protocol may be the FTP protocol 215B, in which case a print job can be created by the conversion device 85 and file transferred to the printer 90. The print job would comprise of the data to be printed and possibly other pertinent information such as number of copies, media type, and print quality. The data would be stored in a file. In both cases, the printer 90 would have the ability to interpret the information from either an email or from FTP.

The conversion resources 216 may include the necessary firmware and/or software to perform various types of data conversion prior to transmitting the data.

Various software and/or firmware programs required to perform the data transmission routine have been described herein as well as software and/or firmware required to operate a conversion device 85 to perform data conversion. It will be appreciated that the various software and/or firmware programs can be embodied in any computer-readable medium for use by or in connection with an instruction execution system, apparatus, or transmission device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the information system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the discussion that follows, flow charts are provided. It is to be understood that any process steps or blocks in these flow charts represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 4:
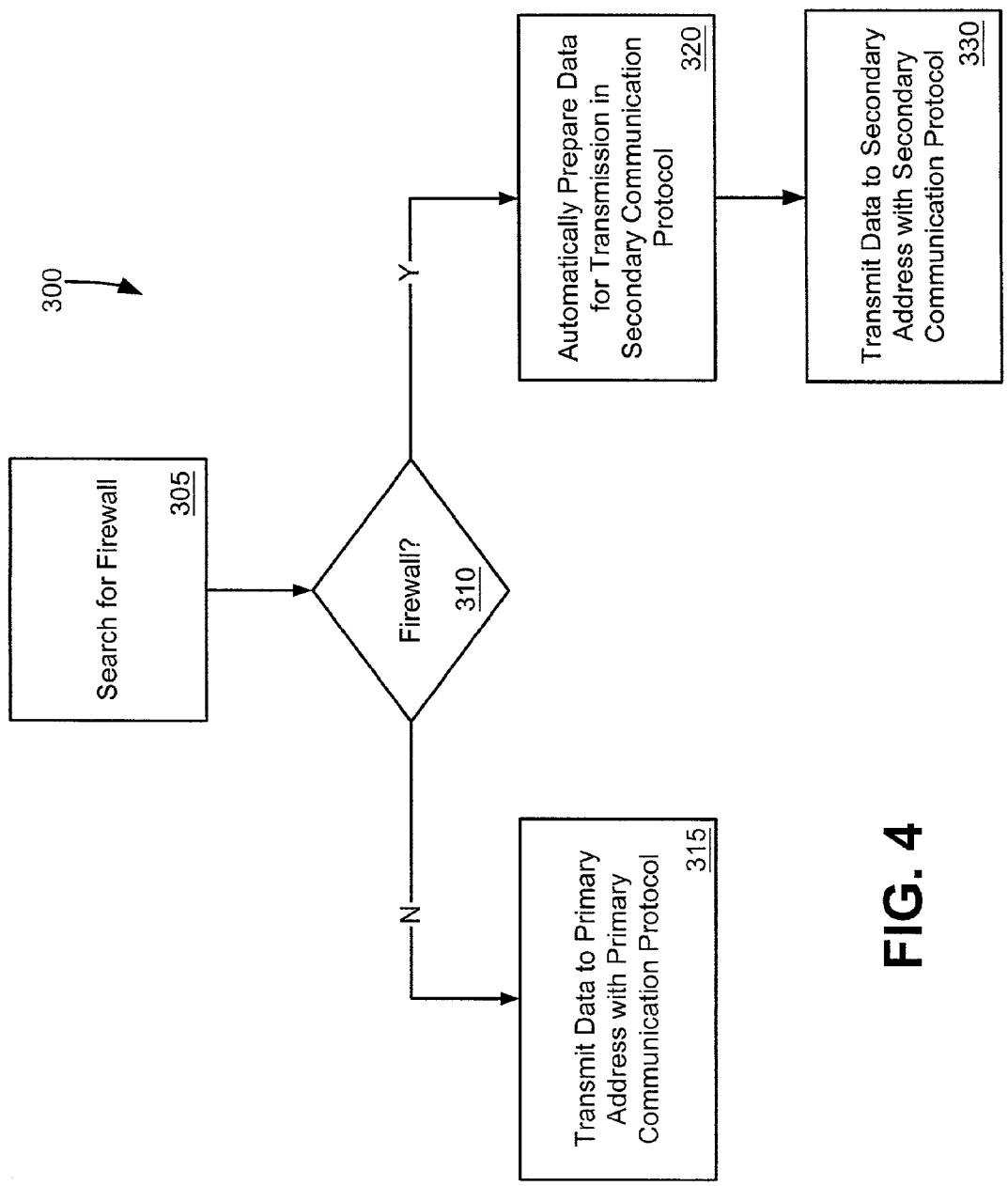
FIG. 4 is a flow chart illustrating a representative embodiment of a method of the present invention.

Reference is now made to FIG. 4, which is a flow chart illustrating a representative embodiment of a method 300 of the present invention. The method 300 begins once a request to transmit data has been received. The request would include the primary and secondary address of the recipient device 60. The first step is to search for a firewall prohibiting communication to the recipient device 60 via the primary communication protocol (step 305). As mentioned earlier, there are several methods known in the art that will recognize a firewall. For instance, the IP address of the recipient device 60 may be "pinged." Generally, pinging an IP address is the process of sending a packet to the designated address and awaiting a response. If no response is found, it may be inferred that a firewall is present and is blocking communication. Another method of searching for a firewall is to port scan the recipient device 60 for an open port related to the primary communication protocol. As mentioned earlier, a brute force method would be to attempt transmission of data using the primary communication protocol, and upon an unsuccessful transmission, the presence of a firewall is inferred. Other methods known and not known in the art may be used to detect a firewall.

If a firewall is not detected, the data may be transmitted to the primary address of the recipient device 60 by utilizing the primary communication protocol (step 315).

If a firewall is detected, the data can be automatically prepared for transmission in the secondary communication protocol (step 320). For instance, an email protocol such as the SMTP protocol may be able to penetrate through the firewall and so an email message must be generated to transfer the data. If the FTP protocol was the secondary communication protocol, the data would be stored in a file. The file could be stored in a print job, which may be another file comprising additional information, and the print job could then be file transferred to the recipient device 60.

Once the data has been prepared for communication via the secondary communication protocol, the data can be transmitted to the secondary address (step 330).

The transmission device 100 and/or the conversion device 85 can perform these steps. These general steps may be performed from within the data transmission program 214 with the help of available communication resources 215A-D (See. FIG. 3).

In other embodiments, a failure to transmit by utilizing the primary communication protocol, may initiate step 320 and step 330. Likewise, the failure to transmit by utilizing the secondary communication protocol may initiate preparation and transmission in a third transmission protocol.

Figure 5:
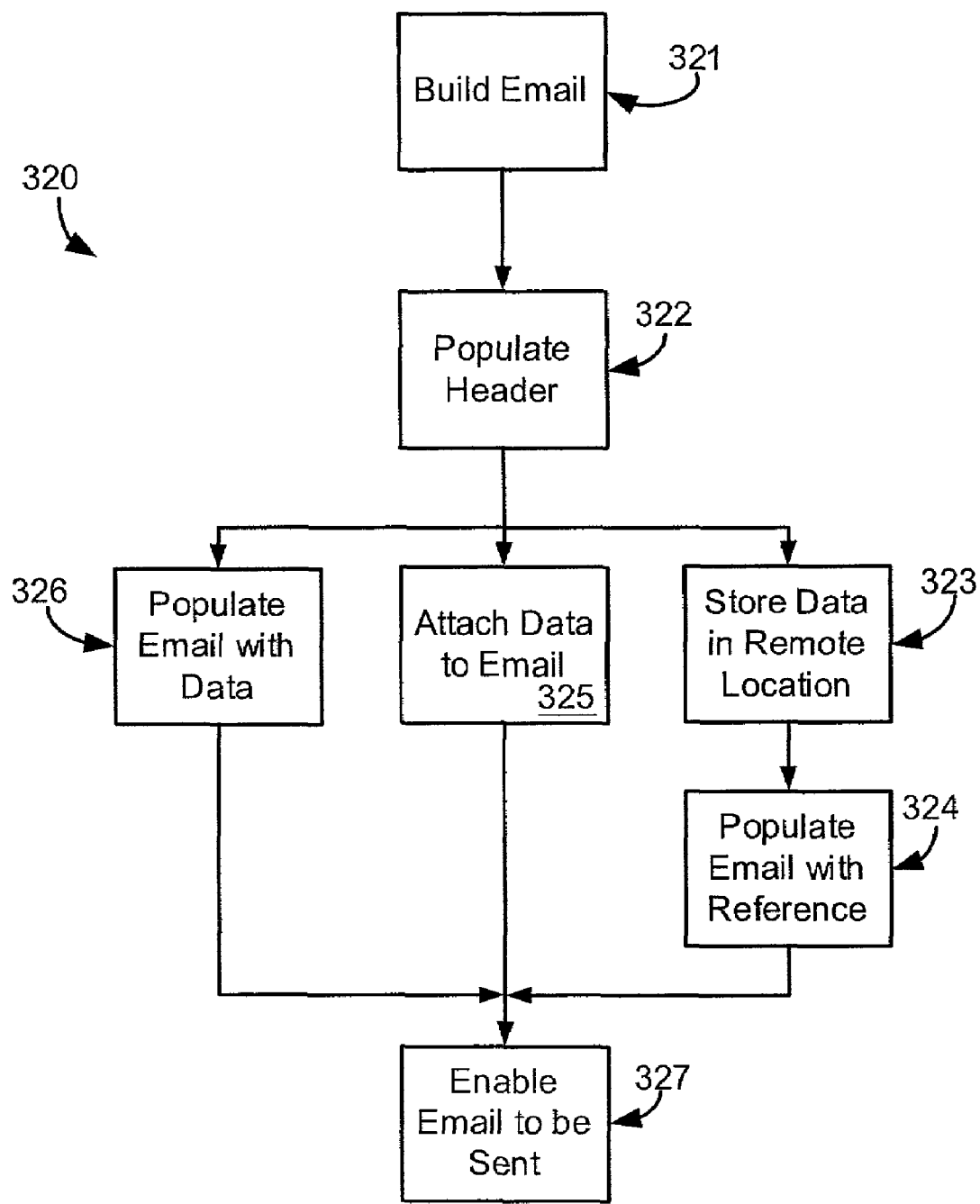
FIG. 5 is a flow chart illustrating a representative embodiment of a method for automatically configuring communication in the secondary communication protocol.

FIG. 5 is a flow chart illustrating a representative embodiment of a method for automatically configuring communication in the secondary communication protocol (step 320 of FIG. 4). In this embodiment, an email protocol such as SMTP may be the secondary communication protocol. The method 320 begins with the building of an email message (step 321). A small file is created to store the contents of the email message. A header of the email message is then populated with pertinent information (step 322). For instance the secondary address (an email address) of the recipient device 60 is set as a recipient of the email message. A default Subject may be included in the header. Conversely, a Subject that includes minimal instructions may be included in the header. Once the header is complete, the body of the email message may be populated with the pertinent data (step 326). The data may be stored in a file and the file may be attached to the email (step 325). Another possible method is for the transmission device 100 and/or the conversion device 85 to store the data in a file in a remote location (i.e. a remote web server) (step 323), in which case, a reference to the remote location may be populated into the body of the email message, or perhaps in the Subject in the header (step 324). Once the email message is complete, it can be sent (step 327). In this case, as mentioned in FIG. 1, typically, the email server 50 will receive the email message before the recipient device 60. The email server 50 can interpret the email, extract the data, and send it to the recipient device 60. The email server 50 may also pass the email along to the recipient device 60, where in turn, the data is extract from the email message.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. For example, it will be appreciated by those skilled in the art that the particular method in which the firewall 20 is detected could be chosen from any means capable of doing so. Likewise, the method in which data is incorporated into an email message. All such modifications and variations are intended to be included herein within the scope of the present invention and protected by the following claims.

The invention claimed is:

1. A method of transmitting data across a firewall, the method comprising:

receiving a request to transmit data to a destination at a remote network;

searching for a firewall associated with the destination at the remote network, the firewall being configured to prohibit communication to the destination via a primary communication protocol and allow communication to the destination via a secondary communication protocol;

if the firewall is detected, automatically configuring the data for communication with the secondary communication protocol; and transmitting the data to the destination by utilizing the secondary communication protocol, wherein the request to transmit the data to the destination comprises a primary address of the destination related to the primary communication protocol and a secondary address of the destination related to the secondary communication protocol.

2. The method of claim 1, further comprising:

transmitting the data to the destination by utilizing the primary communication protocol if the firewall is not detected.

3. The method of claim 2, wherein searching for the firewall comprises:

scanning the destination to find an open port, the open port being related to the primary communication protocol; and detecting the firewall, if present, upon not finding the open port.

4. The method of claim 2, wherein searching for the firewall comprises:

attempting to transmit the data via the primary communication protocol, such that a failure to successfully transmit the data via the primary communication protocol would signify the firewall is present.

5. The method of claim 2, wherein the primary communication protocol is any one or combination of the following: the Hyper-Text Transfer Protocol (HTTP), the Transfer Control Protocol (TCP), the Internet Protocol (IP), the File Transfer Protocol (FTP), and the User Datagram Protocol (UDP).

6. The method of claim 1, wherein the destination is a printer and a print job comprises the data that is requested to be transmitted.

7. The method of claim 1, wherein searching for the firewall comprises pinging the primary address of the destination.

8. The method of claim 1, wherein the secondary communication protocol is an electronic mail (email) protocol and the secondary address is an email address; and further wherein automatically configuring the data for communication comprises:
- generating an email;
- addressing the email to the secondary address; and
- populating the email with pertinent information that correlates to the data.

9. The method of claim 8, wherein automatically configuring the data for communication further comprises: placing the data in the email.

10. The method of claim 8, wherein automatically configuring the data for communication further comprises: attaching the data to the email, the data being stored in a file.

11. The method of claim 8, wherein the information that is populated in the email comprises a reference to a remote location where the data is stored and is accessible from the destination.

12. The method of claim 1, wherein the secondary communication protocol is the File Transfer Protocol (FTP) and the secondary address is an FTP address.

13. A system for rerouting the transmission of data to avoid a firewall, the system comprising:
- a transmission device configured to search for a firewall protecting a destination at a remote network, the firewall at the remote network being configured to prohibit communication to the destination via a primary communication protocol and allow communication to the destination via a secondary communication protocol, the transmission device is further configured to, upon detection of the firewall, automatically configure the data for communication over the secondary communication protocol and transmit the data by utilizing the secondary communication protocol, wherein the transmission device is further configured to receive a request to transmit the data to the destination and the request comprises at least the following:
- a primary address and a secondary address of the destination, the primary address being related to the primary communication protocol and the secondary address being related to the secondary communication protocol and wherein the transmission device is further configured to, upon not detecting the firewall, transmit the data to the destination by utilizing the primary communication protocol.

14. The system of claim 13, wherein the transmission device is further configured to search for the firewall by scanning the destination to find an open port, the open port being related to the primary communication protocol, upon not finding the open port, the firewall is detected.

15. The system of claim 13, wherein the transmission device is further configured to search for the firewall by pinging the primary address of the destination.

16. The system of claim 13, wherein the transmission device is further configured to search for the firewall by attempting to transmit the data via the primary communication protocol, such that a failure to successfully transmit the data via the primary communication protocol would signify the firewall is present.

17. The system of claim 13, wherein the secondary communication protocol is an electronic mail (email) protocol.

18. The system of claim 17, wherein the secondary address is an email address and wherein the transmission device is further configured to automatically configure communication by; generating an email;
- addressing the email to the secondary address; and
- populating the email with pertinent information that correlates to the data.

19. The system of claim 18, wherein the transmission device is further configured to automatically configure the data for communication by placing the data in the email.

20. The system of claim 18, wherein the transmission device is further configured to automatically configure the data for communication by attaching the data to the email, the data being stored in a file.

21. The system of claim 18, wherein the information that is populated in the email comprises a reference to a remote location where the data is stored and is accessible from the destination.

22. The system of claim 13, wherein the secondary communication protocol is the File Transfer Protocol (FTP) and wherein the secondary address is an FTP address.

23. The system of claim 13, wherein the primary communication protocol is any one or combination of the following: the Hyper-Text Transfer Protocol (HTTP), the Transfer Control Protocol (TCP), the Internet Protocol (IP), the File Transfer Protocol (FTP), and the User Datagram Protocol (UDP).

24. The system of claim 13, further comprising: a recipient device configured to be the destination, the recipient device further configured to communicate with the primary and secondary communication protocol.

25. The system of claim 24, wherein the recipient device is a printer and a print job comprises the data.

26. A transmission device configured to transmit data to a destination, the transmission device comprising:
- means for transmitting the data to the destination at a remote network by utilizing a secondary communication protocol;
- means for searching for a firewall at the remote network, the firewall being configured to prohibit communication to the destination by a primary communication protocol and allow communication to the destination via the secondary communication protocol;
- means for automatically configuring the data for communication for the secondary communication protocol upon detecting the firewall; and
- means for receiving a request to transmit the data to the destination, wherein the request comprises at least the following:
- a primary address and a secondary address of the destination, the primary address being related to the primary communication protocol and the secondary address being related to the secondary communication protocol.

27. The device of claim 26, further comprising means for transmitting the data by utilizing the primary communication protocol, wherein upon not detecting the firewall, the data is transmitted by utilizing the primary communication protocol.

28. The device of claim 27, wherein the secondary communication protocol is an electronic mail (email) protocol.

29. The device of claim 27, wherein the secondary address is an email address and wherein the means for automatically configuring the data for communication for the secondary communication protocol comprises:
- means for generating an email;
- means for addressing the email to the secondary address;
- means for populating the email with pertinent information that correlates to the data; and
- means for populating the email with the data.

30. A data transmission program stored on a computer-readable medium, the transmission program comprising:

logic configured to facilitate the transmission of data to a remote network by utilizing a secondary communication protocol;

logic configured to search for a firewall at the remote network, wherein the firewall is configured to prohibit communication to a recipient device at the remote network via a primary communication protocol and allow communication via the secondary communication protocol; and logic configured to automatically configure communication for the secondary communication protocol upon detecting the firewall; and logic configured to receive a request to transmit the data to the recipient device, the request comprising of at least the following; a primary address and a secondary address of the recipient device, the primary address being related to the primary communication protocol and the secondary address being related to the secondary communication protocol.

31. The program of claim 30, further comprising logic configured to facilitate the transmission of the data by utilizing the primary communication protocol, wherein upon not detecting the firewall, the data is transmitted by utilizing the primary communication protocol.

32. The program of claim 30, wherein the secondary address is an electronic mail (email) address and the secondary communication protocol is an email protocol; and wherein the logic configured to automatically configure the data for communication for the secondary communication protocol comprises:

logic configured to generate an email;

logic configured to address the email to the secondary address;

logic configured to populate the email with pertinent information that correlates to the data; and logic configured to populate the email with the data.

33. The program of claim 30, wherein the secondary communication protocol is the File Transfer Protocol (FTP) and the secondary address is an FTP address.

34. The program of claim 30, wherein the primary communication protocol is any one or combination of the following:

the Hyper-Text Transfer Protocol (HTTP), the Transfer Control Protocol (TCP), the Internet Protocol (IP), the File Transfer Protocol (FTP), and the User Datagram Protocol (UDP).

* * * * *

UNITED STATES PATENT AND TRADEMARK OFFICE
CERTIFICATE OF CORRECTION

| | | |
|---|---|---|
| PATENT NO. | : 7,631,350 B2 | Page 1 of 1 |
| APPLICATION NO. | : 10/091740 | |
| DATED | : December 8, 2009 | |
| INVENTOR(S) | : Travis J. Parry | |

It is certified that error appears in the above-identified patent and that said Letters Patent is hereby corrected as shown below:

In column 12, line 4, in Claim 18, delete "by;" and insert -- by: --, therefor.

In column 13, line 18, in Claim 30, delete "following;" and insert -- following: --, therefor.

Signed and Sealed this

Twenty-fourth Day of August, 2010

David J. Kappos
*Director of the United States Patent and Trademark Office*